SEMICONDUCTOR SIGNAL TRANSLATING CIRCUIT

Filed Oct. 26, 1954

INVENTOR.
David D. Holmes
BY H. D. Newton
ATTORNEY.

1

2,920,189

SEMICONDUCTOR SIGNAL TRANSLATING CIRCUIT

David D. Holmes, Princeton, N.J., assignor to Radio Corporation of America, a corporation of Delaware Application October 26, 1954, Serial No. 464,763

8 Claims. (Cl. 250—20)

Figure 1:
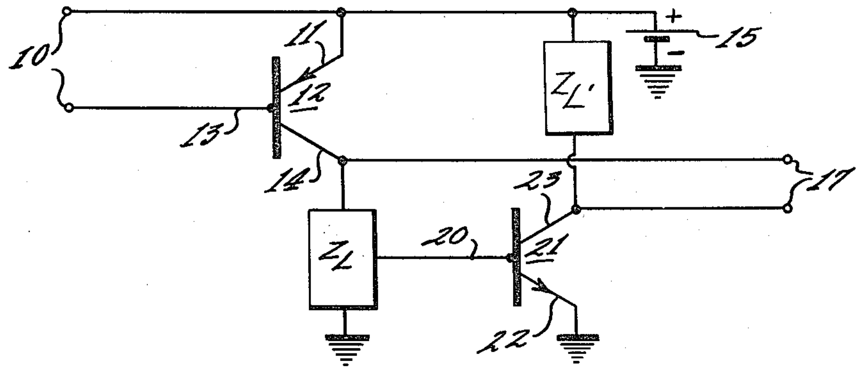

The present invention relates generally to signal translating circuits and particularly to signal detector and wide band signal amplifier circuits for use in television signal receiving systems and the like.

A typical television signal receiving system is a superheterodyne type of receiving system arranged to process both frequency modulated and amplitude modulated signal waves. The brightness information which is utilized to ultimately control the image reproducing beam intensity, and thus reproduce an image of a televised subject, is transmitted as amplitude modulation of the carrier wave.

This brightness information is recovered from the carrier wave by a suitable amplitude modulation detector or video detector after the carrier wave has been amplified in the form of an intermediate frequency signal wave, but since it is impractical to provide the necessary system gain in the intermediate frequency signal amplifier portions of the system, it is generally necessary to provide wide band signal amplification between the video detector and the kinescope.

The video signal amplifier portion of a television signal receiving system generally consists of one or two signal amplifier stages compensated to have a good amplitude and time-delay characteristic to an upper frequency limit in the order of four megacycles. The output circuit of the video amplifier portion of the system is coupled with the control electrode of the kinescope to control the beam intensity in accordance with the video signal.

It is an object of the present invention to provide an improved combined amplitude modulation signal detector and wide band signal amplifier circuit effectively utilizing a pair of semiconductor devices of opposite conductivity types.

It is a further object of the present invention to provide an improved combined amplitude modulation signal detector and wide band signal amplifier circuit employing semiconductor devices of opposite conductivity types to provide improved operation with a minimum of circuit elements.

It is another object of the present invention to provide an improved combined amplitude modulation signal detector and signal amplifier circuit utilizing semiconductor devices of opposite conductivity types to provide a push-pull output signal from a single ended input signal.

It is still another object of the present invention to provide an improved combined video signal amplifier and detector circuit utilizing semiconductor devices of opposite conductivity types for efficient, stable, wide band signal translation.

These and other objects of the present invention are accomplished by employing a first semiconductor device of one conductivity type as a combined amplitude modulation signal detector and signal amplifier. The output circuit of the first device is coupled with a utilization device and also with the input circuit of a second semiconductor device of opposite conductivity type which is utilized as a phase inverter and a signal amplifier to provide an output signal for the utilization device which is of the same order of magnitude as and in phase opposition with the input signal of the first device. A push-pull output signal is thus developed from the modulation envelope of an amplitude modulated carrier wave.

2

Figure 2:
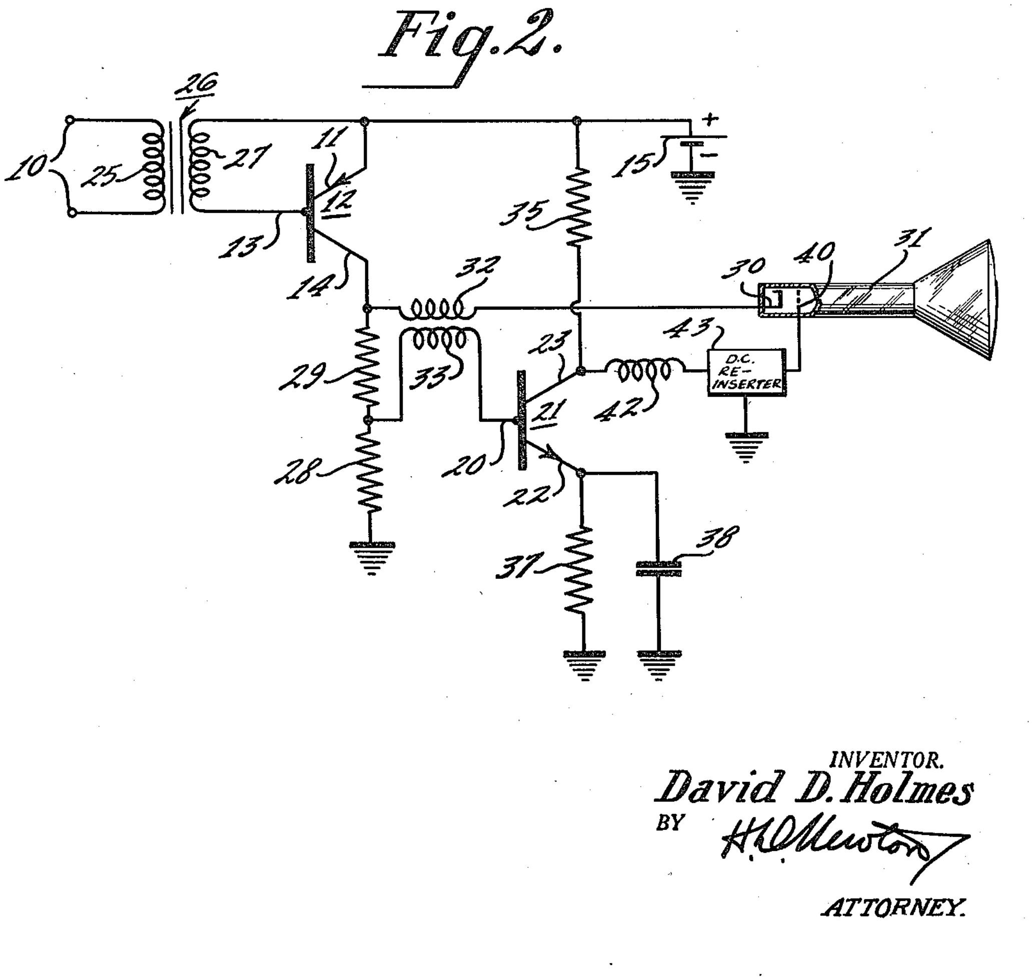

The novel features that are considered characteristic of this invention are set forth in the appended claims. The invention itself, however, both as to its organization and method of operation, as well as additional objects and advantages thereof, will best be understood from the following description when read in connection with the accompanying drawing, in which:

Figure 1 is a schematic circuit diagram of a combined amplitude modulation signal detector and signal amplifier circuit provided in accordance with the present invention; and Figure 2 is a schematic circuit diagram of a specific embodiment of a combined amplitude modulation detector and signal amplifier circuit in accordance with the present invention.

Referring now to the drawing and particularly to Figure 1 an amplitude modulated carrier wave signal may be applied from any convenient source such as the final intermediate frequency amplifier stage in a television receiving system to a pair of input terminals 10 one of which is connected to the emitter electrode 11 of a semiconductor device, illustrated as a PNP junction transistor 12, the other of which is connected to the base electrode 13.

The junction transistor is illustrated as a PNP junction transistor, however, it is to be noted that other semiconductor devices having similar characteristics may be utilized in place of the junction transistor without departing from the scope of this invention. The PNP junction transistor 12 is also used for the purpose of illustration only and can be readily replaced by a semiconductor device of opposite conductivity type by merely reversing the polarity of the biasing source and reversing the conductivity type of the second transistor as will be discussed hereinafter.

The load circuit for the transistor 12 comprises a direct current conductive load impedance illustrated generically as a rectangle containing the legend $Z_L$ which is connected between the collector electrode 14 and a point of fixed reference potential such as ground. Energizing currents for the transistor 12 may be provided from any convenient source of direct current energizing potential which is illustrated as a battery 15 connected between the emitter electrode 11 and signal ground.

Output signals which may be derived from across the load impedance element may be applied to one terminal of a utilization device such as the cathode of a kinescope from one of a pair of output terminals 17 which is connected directly to the collector electrode 14. A portion of the output signal which is developed across the load impedance element is applied to the base electrode 20 of a second semiconductor device, illustrated as a junction transistor 21 of the NPN variety which is utilized as a phase inverter and a signal amplifier in accordance with the present invention. The emitter electrode 22 of the transistor 21 is connected directly to signal ground and the collector electrode 23 is connected to the second of the pair of output terminals 17. The collector electrode 23 is connected to the positive terminal of the battery 15 through a second load impedance $Z_L'$.

It is of course to be understood that if a substitution is made for the transistor 12 by utilizing a transistor of opposite conductivity type such as a junction transistor of the NPN variety, the transistor 21 would have to be a PNP transistor and the polarity of the battery 15 would have to be reversed, that is, the negative terminal of the battery 15 would have to be connected to the emitter electrode 11 and the positive terminal of the battery 15 would then have to be connected to ground.

It may be readily seen that if an amplitude modulated carrier wave is applied to the input terminals 10, signal rectification will be accomplished in the emitter-base electrode path of the transistor 12 due to the fact that the emitter-base electrode biasing is provided by the input signal only.

Accordingly, an output signal will be developed across the load impedance element which will be an amplified version of the modulation envelope of the input carrier wave signal. A portion of this amplified signal will be applied between the base and emitter electrodes of the transistor 21; and in view of the amplifying properties of a junction transistor, a signal having a predetermined amplitude may be developed across the second load impedance $Z_L'$ and derived from the collector electrode 23.

Due to a phase reversal through the transistor 21, the output signal which will be developed between the output terminals 17 will represent a push-pull output signal. To illustrate this fact, assume that the output signal developed at the collector electrode 14 is a positive going signal with respect to ground. The signal which is developed at the collector electrode 23 will then be a negative going signal with respect to ground. Accordingly, it may be seen that the output terminals 17 will provide an output signal which has as its magnitude the peak-to-peak value of the output voltage developed between the two collector electrodes 14 and 23.

A specific embodiment of the present invention which has been successfully utilized in a television receiving system is illustrated in Figure 2 wherein the input signal applied to the pair of input terminals 10 was derived from the last intermediate frequency signal amplifier stage of the television receiving system. The pair of input terminals 10 are connected to the primary winding 25 of an input coupling transformer 26 which also includes a secondary winding 27 connected in series between the emitter electrode 11 and the base electrode 13.

In this specific example the load impedance element is a pair of resistors 28 and 29 which are connected in series arrangement between the collector electrode and signal ground and are utilized as a voltage divider network to select the appropriate driving signal for the second transistor 21.

Accordingly, an output signal is derived from across the voltage divider network and is applied to the cathode 30 of a kinescope 31 through a series peaking coil 32. The series peaking coil is provided with a secondary winding 33 which is connected between the base electrode 20 and the junction of the voltage divider resistors 28 and 29.

Energizing current for the second transistor 21 is provided through the second load impedance element, here illustrated as a resistor 35, connected between the positive terminal of the battery 15 and the collector electrode 23. Stability of operation of the transistor 21 is enhanced by a series emitter resistor 37 which is connected between the emitter electrode 22 and signal ground. The emitter resistor 37 may be bypassed for signal frequencies by a capacitor 38 connected in shunt therewith. It is of course possible to select the capacitance of the capacitor 38 to provide a predetermined degree of low frequency attenuation due to the effect of the emitter resistor 37.

Output signals which are derived from the collector electrode 23 are applied to the control electrode 40 of the kinescope 31 through a series peaking coil 42 and D.C. reinsertion may be accomplished in a conventional manner which is illustrated as a hollow rectangle 43 connected in series between the series peaking coil 42 and the control grid 40 with a lead connected from an intermediate portion of the hollow rectangle to signal ground. The D.C. reinsertion means may be a diode D.C. reinsertion means as is conventional and forms no part of the present invention.

It now may be seen that if an input signal is applied to the input terminals 10, signal rectification will be accomplished in the emitter-base diode path of the transistor 12 as above discussed. Accordingly, an output signal will be developed across the series load resistors 28 and

29 which will be applied to the cathode 30 of the kinescope 31. The relative high frequency response of the applied signal is enhanced due to the action of the series peaking coil 32.

A portion of the output signal, that is, that portion of the output signal which is developed across the load resistor 28 is applied between the base electrode 20 and the emitter electrode 22 and an output signal is developed at the collector electrode 23 which is in phase opposition with respect to ground to the output signal which is developed at the collector electrode 14. The secondary winding 33 of the series peaking coil 32 serves to provide better impedance matching at high frequencies and to provide an additional signal input at high frequencies to the transistor 21. Accordingly, it is readily understood that the high frequency input to the transistor 21 is enhanced and that the output signal developed at the collector electrode 23 will be enhanced at the high frequency end of the spectrum with respect to the low frequency end of the spectrum. This relative enhancement is also aided due to the slight degeneration of the low frequency end of the spectrum which is accomplished by the action of the emitter resistor 37 which is only partially bypassed by the capacitor 38. Additional high frequency enhancement is accomplished by the series peaking coil 42 which is connected between the collector electrode 23 and the control grid 40.

As above discussed it may be readily seen that due to the phase reversing properties of the transistor 21 the output signal which is developed at the collector electrode 23 will be in phase opposition with respect to ground to the output signal developed at the collector electrode 14. Accordingly, a push-pull output signal is applied between the cathode 30 and the control electrode 40.

It is therefore possible with the combined video detector and video signal amplifier circuit of the present invention to provide an output signal of sufficient magnitude to effectively drive a kinescope. It has also been found that a band width in the order of four megacycles is readily obtainable with the coupling circuit as provided by the present invention. Accordingly, in accordance with the present invention a pair of semiconductor devices of opposite conductivity type are connected in cascade relation to provide a combination amplitude modulation detector and signal amplifier circuit wherein the first of the transistors provides a combined function of signal detection and signal amplification and the second of the cascade coupled transistors provides the combined function of signal amplification and phase reversal to provide a push-pull output signal from a single ended amplitude modulation carrier wave. Stable operation is provided over the necessary band width and interchangeability of transistors is readily accomplished due to the inherently stable operation provided by the circuit from a single source direct current operating potential. The coupling transformer provides a substantial improvement in gain-bandwidth product.

I claim:

1. A signal translating circuit comprising in combination a pair of semiconductor devices of opposite conductivity types each including base, emitter and collector electrodes, a signal input circuit connected between the base and emitter electrodes of the first of said pair of semiconductor devices, signal conveying means coupling the base electrode of the second of said pair of semiconductor devices with the collector electrode of the first of said pair of semiconductor devices, means connecting the emitter electrodes of said semiconductor devices and a signal voltage output circuit connected between the collector electrodes of said pair of semiconductor devices.

2. A signal translating circuit comprising in combination a pair of semiconductor devices of opposite conductivity types, each including base, emitter and collector electrodes, each of said devices being connected in a common emitter signal translating configuration and said pair of semiconductor devices being connected in cascade relation, a signal input circuit connected between the base and emitter electrodes of the first of said pair of semiconductor devices, and an output circuit connected between the collector electrodes of said pair of semiconductor devices.

3. A signal translating circuit comprising in combination a pair of semiconductor devices of opposite conductivity types each including base, emitter and collector electrodes, a signal input circuit connected between the base and emitter electrodes of the first of said pair of semiconductor devices, a signal output circuit coupled with the collector electrode of the first of said pair of semiconductor devices, a first coupling means providing a direct current conductive path between the collector electrode of the first of said pair of semiconductor devices and the base electrode of the second of said pair of semiconductor devices, a second coupling means providing a frequency selective path between the collector electrode of the first of said pair of semiconductor devices and the base electrode of the second of said pair of semiconductor devices, and signal conveying means connected between said output circuit and the collector electrode of the second of said pair of semiconductor devices.

4. A combined signal detector amplifier circuit comprising in combination, a first semiconductor device of one conductivity type having input, common and output electrodes, circuit means coupled between said input and common electrodes for applying modulated input signals thereto, said circuit means being adapted to provide bias to said input and common electrodes for detection of said modulated input signals, a load impedance element coupled with said output electrode, a second semiconductor device of opposite conductivity type having input, common and output electrodes, the input electrode of said second semiconductor device being coupled with said load impedance element and a second load impedance element connected with the output electrode of said second semiconductor device, and an output circuit coupled between said output electrodes.

5. A combined signal detector amplifier circuit comprising in combination, a first semiconductor device of one conductivity type having base, emitter and collector electrodes, an input circuit coupled between said base and emitter electrodes for applying modulated input signals and bias suitable for detection thereto, a load circuit connected with said collector electrode, a second semiconductor device of opposite conductivity type having base, emitter and collector electrodes, means connecting the base electrode of said semiconductor device with said load circuit a second load circuit connected with the collector electrode of said second semiconductor device, means coupling said emitter electrodes, and a voltage operated utilization means coupled with each of said collector electrodes.

6. A combined amplitude modulation signal detector and amplifier circuit comprising in combination, a first semiconductor device of one conductivity type having base, emitter and collector electrodes, an input circuit connected between said base and emitter electrodes for applying modulated input signals and bias suitable for detection thereto, a load impedance element connected with said collector electrode, a second semiconductor device of opposite conductivity type having base, emitter and collector electrodes, the base electrode of said second semiconductor device being connected with said load impedance element, means connecting the emitter electrode of said first semiconductor device to the emitter electrode of said second semiconductor device, a source of energizing current connected with the emiter electrode of said first semiconductor device and the collector electrode of said second semiconductor device, a second load impedance element interposed in the connection between said source of energizing potential and said collector electrode of said second semiconductor device, and a signal output circuit connected with each of said collector electrodes.

7. A signal translating circuit comprising in combination, a pair of semiconductor devices of opposite conductivity types, each including base, emitter and collector electrodes, a signal input circuit coupled between the base and emitter electrodes of the first of said pair of semiconductor devices, a load element connected between the collector electrode of said first of said pair of semiconductor devices and a point of fixed reference potential, an output circuit, a series peaking coil connected in series between the collector electrode of said first of said pair of semiconductor devices and said output circuit, said peaking coil having a secondary winding inductively coupled therewith and connected in series between said load element and the base electrode of the second of said pair of semiconductor devices, signal conveying means connected between the collector electrode of the second of said pair of semiconductor devices and said output circuit, signal conveying means connecting said emitter electrode to said point of fixed reference potential, a second load impedance element connected to said collector electrode of said second semiconductor device, and a source of direct energizing current connected between said point of fixed reference potential and the emitter electrode of one and through said second load impedance element to the collector electrode of the other of said pair of semiconductor devices.

8. A signal translating circuit comprising in combination, a pair of semiconductor devices of opposite conductivity types, each including base, emitter and collector electrodes, a signal input circuit connected between the base and emitter electrodes of the first of said pair of semiconductor devices, a signal output circuit including first and second load resistors connected in series between the collector electrode of said first of said pair of semiconductor devices and a point of fixed reference potential, a pair of output terminals, an inductor connected in series between the collector electrode of said first of said pair of semiconductor devices and one of said pair of output terminals, said inductor having a secondary winding inductively coupled therewith and connected in series between the base electrode of the second of said pair of semiconductor devices and the junction of said first and second load resistors, signal conveying means connected between the collector electrode of the second of said pair of semiconductor devices and the other of said pair of output terminals signal conveying means connecting said emitter electrode to said point of fixed reference potential, third load resistor connected to said collector electrode of said second semiconductor device, and a source of direct energizing current connected between said point of fixed reference potential and the emitter electrode of one and through said third resistor to the collector electrode of the other of said pair of semiconductor devices.

References Cited in the file of this patent

UNITED STATES PATENTS

| | | |
|---|---|---|
| 2,663,806 | Darlington | Dec. 22, 1953 |
| 2,731,567 | Sziklai et al. | Jan. 17, 1956 |
| 2,745,038 | Sziklai | May 8, 1956 |
| 2,801,296 | Blecher | July 30, 1957 |

OTHER REFERENCES

Article by Sziklai et al.: Proc. of IRE, June 1953, pages 708–713.

Article by Angell et al.: Proc. of IRE, December 1953, page 1710.

Publication: Radio and Television News, June 1954, pp. 43–45, 117, "Ultra-Linear" Operation of 6V6 tubes by Hafler.